United States Patent
Kumar et al.

(10) Patent No.: US 11,498,038 B2
(45) Date of Patent: Nov. 15, 2022

(54) QUENCH-BOX ASSEMBLY FOR HYDROPROCESSING REACTORS

(71) Applicant: Indian Oil Corporation Limited, Mumbai (IN)

(72) Inventors: Pravesh Kumar, Faridabad (IN); Ramesh Karumanchi, Faridabad (IN); Sarvesh Kumar, Faridabad (IN); Madhusudhan Sau, Faridabad (IN); Gurpreet Singh Kapur, Faridabad (IN); Sankara Sri Venkata Ramakumar, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 17/364,182

(22) Filed: Jun. 30, 2021

(65) Prior Publication Data

US 2022/0001341 A1   Jan. 6, 2022

(30) Foreign Application Priority Data

Jul. 4, 2020   (IN) .............................. 202021028524

(51) Int. Cl.
   *B01F 5/06*   (2006.01)
   *B01J 19/00*   (2006.01)
   (Continued)

(52) U.S. Cl.
   CPC ........ *B01F 25/4312* (2022.01); *B01F 23/232* (2022.01); *B01J 19/006* (2013.01);
   (Continued)

(58) Field of Classification Search
   CPC .......... B01F 2025/913; B01F 2025/916; B01F 2215/0422; B01F 23/232; B01F 25/4312;
   (Continued)

(56) References Cited

U.S. PATENT DOCUMENTS 3,787,189 A   1/1974 Muffat et al.
7,112,312 B2   9/2006 Chou
(Continued)

FOREIGN PATENT DOCUMENTS

EP   0471117 A1   2/1992

*Primary Examiner* — Ellen M McAvoy
*Assistant Examiner* — Chantel L Graham
(74) *Attorney, Agent, or Firm* — Workman Nydegger

(57) ABSTRACT

The invention relates to Quench box assembly comprising quench pipe and quench box, to mix quench gas and vapor-liquid effluent from previous catalyst bed to achieve equilibrium temperature before entering the next bed. The quench pipe is in the form of ring having aperture while quench box consists of swirling section and a mixing chamber. The swirling section consists of inclined baffles to provide swirling action to incoming stream and the turbulence created by the swirling action increases the heat transfer rate thus requiring the smaller reactor volume to attain equilibrium temperature. The perforated plate being open from all the sides allowing the liquid to flow uniformly from all directions thus providing uniform distribution on the distributor tray. Hence, eliminates the requirement of rough liquid distributor before the distribution tray.

5 Claims, 2 Drawing Sheets

Design of Quench box (Present Invention)

(51) Int. Cl.
*C10G 45/00* (2006.01)
*C10G 47/00* (2006.01)
*B01F 3/04* (2006.01)
*B01F 25/431* (2022.01)
*B01F 23/232* (2022.01)
*B01F 25/00* (2022.01)

(52) U.S. Cl.
CPC .......... *B01J 19/0013* (2013.01); *C10G 45/00* (2013.01); *C10G 47/00* (2013.01); *B01F 2025/913* (2022.01); *B01F 2025/916* (2022.01); *B01F 2215/0422* (2013.01); *B01J 2219/0077* (2013.01); *B01J 2219/00123* (2013.01)

(58) Field of Classification Search
CPC .................. B01J 19/0013; B01J 19/006; B01J 2208/00371; B01J 2208/00849; B01J 2208/00893; B01J 2208/00938; B01J 2219/00123; B01J 2219/0077; B01J 8/0453; B01J 8/0496; C10G 45/00; C10G 47/00; C10G 49/002
See application file for complete search history.

(56) References Cited

U.S. PATENT DOCUMENTS

| | | | |
|---|---|---|---|
| 9,321,023 | B2 | 4/2016 | Xu |
| 9,878,298 | B2 | 1/2018 | Degaleesan et al. |
| 10,668,442 | B1* | 6/2020 | Xu ........................ B01J 8/0453 |
| 2002/0172632 | A1* | 11/2002 | Chou .................... B01J 8/0492 |
| | | | 422/607 |
| 2015/0003187 | A1* | 1/2015 | Xu ........................ B01J 8/0453 |
| | | | 366/184 |
| 2017/0144122 | A1* | 5/2017 | Degaleesan ............ B01J 8/0453 |

* cited by examiner

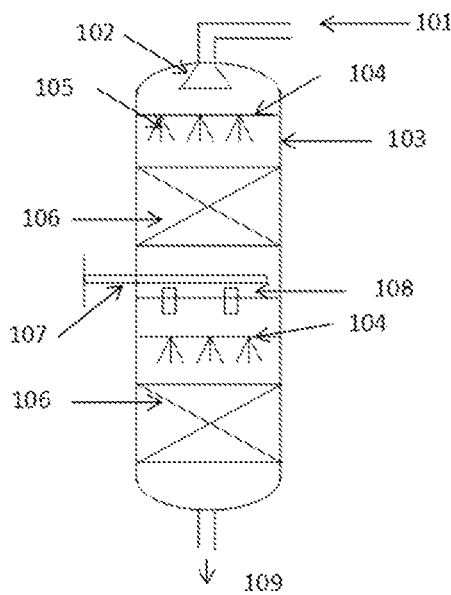
Figure-1 Schematic view of an exemplary configuration of a hydro-processing reactor (PRIOR ART).
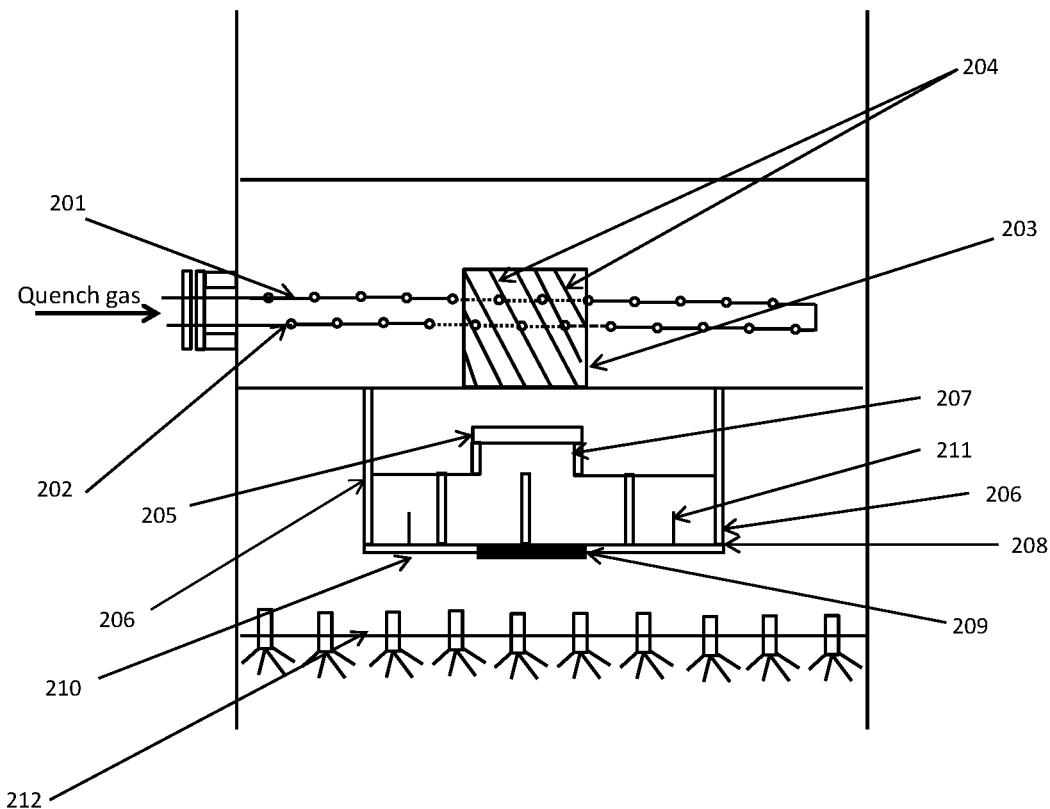
Figure-2: Design of Quench box (Present Invention)

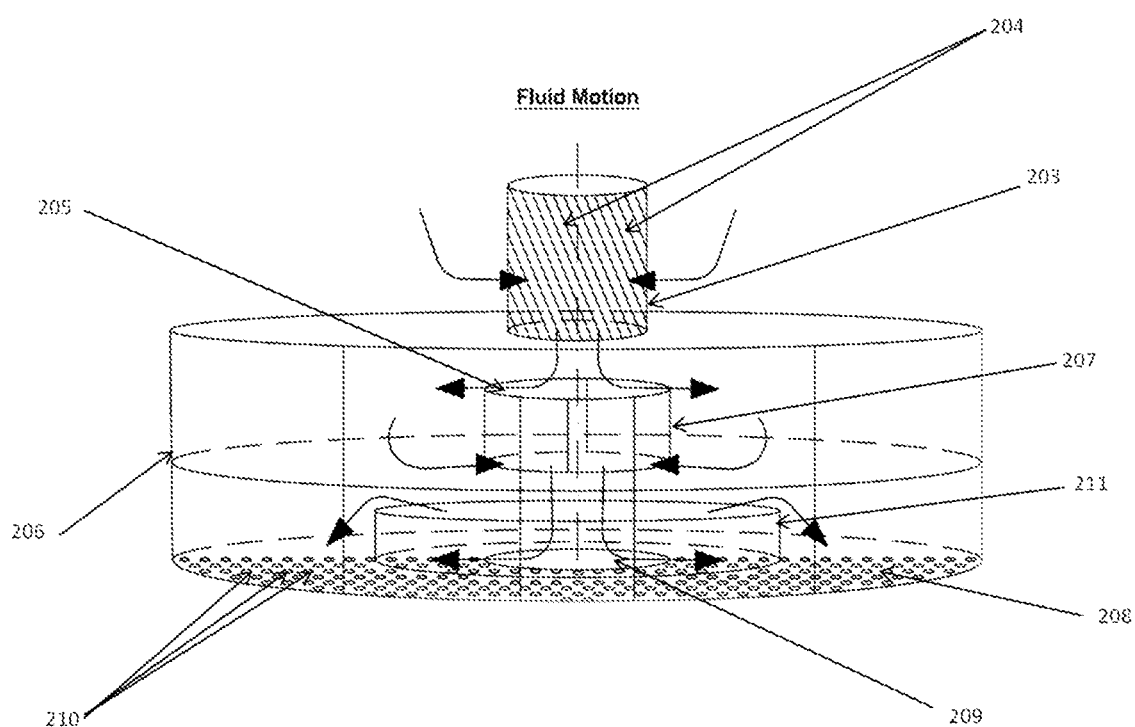
Figure 3. Fluid motion in the quench box (Present Invention)

QUENCH-BOX ASSEMBLY FOR HYDROPROCESSING REACTORS

FIELD OF THE INVENTION

The present invention covers Quench box assembly comprising quench pipe and quench box for down-flow, three-phase fixed bed hydro-processing reactor is disclosed. The quench pipe is in the form of ring having aperture while quench box consists of swirling section and a mixing chamber.

BACKGROUND OF THE INVENTION

In co-current down-flow reactors the gas and liquid flow downward over the catalyst bed. During reaction the temperature of the reaction mixture increases. To limit the temperature rise in the reactor within permissible limit the reactor is divided into different beds and quench gas followed by mixing device is provided to cool down the effluent before entering into the next bed. The apparatus is located between two catalyst beds. The quench gas and vapor-liquid effluent from catalyst bed gets mixed in the mixing chamber to achieve equilibrium temperature before entering the next bed.

EP0471117A1 covers the quench box assembly having improved mixing efficiency comprises a series of mixing zones: quench fluid inlet zone; quench box mixing zone; a jet stirred mixing zone; and a distributor zone. In the quench fluid inlet zone, quench fluid is introduced to fluid from the catalytic bed above. However, the reaction fluid and quench fluid enter the quench mixing zone through the central opening (16) and no means to mix theses fluids thoroughly is provided. Furthermore, plurality of pipes (22) for introduction of quench gas and process fluid into jet stirred mixing zone, may result into non-uniform temperature from different pipes.

U.S. Pat. No. 7,112,312B2 covers the compact quench box design for a multi-bed, mixed-phase co-current down-flow fixed-bed reactor has a quench pipe manifold and nozzle assembly, a collection tray, a mixing chamber, and a single final distributor tray. The quench pipe manifold and nozzle assembly is an annular ring pipe having nozzles arising there from. However, the multiple ramps (50) and mixing chamber (36) for reaction fluid and quench fluid may lead to different temperature in ramps (50) and mixing chamber (36) leading to uneven temperature after the quench-box assembly.

SUMMARY OF THE PRESENT INVENTION

The Quench box assembly disclosed in the present invention is to mix quench gas and vapor-liquid effluent from previous catalyst bed to achieve equilibrium temperature before entering the next bed comprises quench pipe and quench box. The quench pipe is in the form of a ring with apertures for quench gas flow. The quench box consists of a swirling section and a mixing chamber. It provides higher interfacial area and flow path for heat transfer between quench gas and hot reactor effluent. The swirling motion in the swirling section provides better contacting. The weir in the mixing section creates turbulence and helps to attain equilibrium temperature for entire fluid as it is the only passage for fluid flow. Furthermore, the baffle on the plate calms liquid down and provide higher residence time and turbulence for the incoming fluid resulting in higher heat transfer rate. The perforated plate being open from all the sides allowing the liquid to flow uniformly from all directions thus providing uniform distribution on the distributor tray. Hence, eliminates the requirement of rough liquid distributor before the distribution tray.

OBJECTIVES OF THE PRESENT INVENTION

It is a primary objective of the invention which relates to Quench box assembly comprising quench pipe and quench box for down-flow, three-phase fixed bed hydro-processing reactor.

It is the further objective of the present invention is quench pipe is in the form of ring having aperture while quench box consists of swirling section and a mixing chamber.

Further the object of this invention is that the aforesaid quench box helps to achieve the equilibrium temperature to the hot-reactor effluent and the quench gas entering from the quench pipe.

BRIEF DESCRIPTION OF DRAWINGS

To further clarify advantages and aspects of the invention, a more particular description of the invention will be rendered by reference to specific embodiments thereof, which is illustrated in the appended drawing(s). It is appreciated that the drawing(s) depict only typical embodiments of the invention and are therefore not to be considered limiting of its scope.

FIG. 1: Schematic view of an exemplary configuration of a prior art hydro-processing reactor.

FIG. 2: The design of proposed Quench box in accordance with an embodiment of the present invention.

FIG. 3: Fluid motion in the quench box in accordance with an embodiment of the present invention.

DETAILED DESCRIPTION OF THE INVENTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein.

The terminology and structure employed herein is for describing, teaching and illuminating some embodiments and their specific features and elements and does not limit, restrict or reduce the spirit and scope of the invention.

Unless otherwise defined, all terms, and especially any technical and/or scientific terms, used herein may be taken to have the same meaning as commonly understood by one having an ordinary skill in the art.

Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

A commonly used vapor liquid downward flow fixed bed reactor is shown in FIG. 1 (prior art). The gas-liquid mixture enters through a feed pipe 101 and through inlet diffuser 102 gets distributed on the distributer tray 104, having distribution units 105 through catalyst bed 106 installed inside the reactor 103. The hot effluent from the catalyst bed 106 and the quench gas from quench pipe 107 gets mixed in the quench box 108 and flows to the catalyst bed 106/outlet 109. FIG. 1 is a schematic view of an exemplary configuration of a prior art hydro-processing reactor.

The Quench box assembly disclosed in the present invention is to mix quench gas and vapor-liquid effluent from previous catalyst bed to achieve equilibrium temperature before entering the next bed comprises quench pipe and quench box. The quench pipe is in the form of a ring with apertures for quench gas flow. The quench box consists of a swirling section and a mixing chamber. It provides higher interfacial area and flow path for heat transfer between quench gas and hot reactor effluent. The swirling motion in the swirling section provides better contacting. The weir in the mixing section creates turbulence and helps to attain equilibrium temperature for entire fluid as it is the only passage for fluid flow. Furthermore, the baffle on the plate calms liquid down and provide higher residence time and turbulence for the incoming fluid resulting in higher heat transfer rate. The perforated plate being open from all the sides allowing the liquid to flow uniformly from all directions thus providing uniform distribution on the distributor tray. Hence, eliminates the requirement of rough liquid distributor before the distribution tray.

In accordance with the present subject matter, the present invention provides a Quench box assembly for hydro-processing reactors comprising:
  a) quench pipe (201) in the form of ring having apertures (202) on its surface; and
  b) quench box for down-flow, said quench box comprising swirling section (203) and a gas-liquid mixing chamber (206).

In yet another embodiment, the present invention provides a Quench box assembly, wherein the quench pipe (201) is located around the swirling section (203) of the quench box and the swirling section (203) is having inclined baffles (204) to provide swirling motion to the incoming gas-liquid mixture.

In accordance with the present subject matter, the present invention provides a Quench box assembly, wherein the gas-liquid mixture from the swirling section (203) impinges on the plate (205) and splash around in the mixing chamber (206) and flows downward through the weir (207).

In yet another embodiment, the present invention provides a Quench box assembly, wherein gas-liquid mixture travels from the weir (207) to the perforated plate (208) which is solid at the centre (209) below the weir outlet and having aperture (210) and a baffle in the form of the ring (211).

In accordance with the present subject matter, the present invention provides a Quench box assembly, wherein the perforated plate (208) is open from the sides allowing the liquid to flow uniformly from all directions thus providing uniform distribution on the distributor tray (212).

In yet another embodiment, the present invention provides a Quench box assembly, wherein swirling section (203) is having baffles (204) inclined at an angle preferably between 30 to 60°.

In accordance with the present subject matter, the present invention provides a process for mixing quench gas and vapor-liquid effluent by Quench box assembly, said process comprising:
  a) providing swirling motion by swirling section (203) to the incoming fluid from a ring shaped quench pipe (201) having apertures (202); wherein swirling section (203) is having baffles (204) inclined at an angle preferably between 30 to 60°;
  b) impinging the fluid from the swirling section (203) on the plate (205) and splashing around the mixing chamber (206) for obtaining gas-liquid mixture and attaining equilibrium temperature;
  c) flowing the gas-liquid mixture obtained in step (b) through the weir (207) located at the centre of mixing chamber (206) on the perforated plate (208); wherein the plate is solid at the centre (209) below the weir outlet and having aperture (210) and a circular baffle (211);
  d) creating turbulence by the circular baffle (211) and increasing the residence time of the gas-liquid mixture on the plate (208); and
  e) flowing the gas-liquid mixture in downward direction from open sides of plate (208) to distributor plate (new reference).

In accordance with an embodiment of our present invention, design of proposed Quench box is given in FIG. 2. The quench pipe and quench box is shown in FIG. 2. The quench pipe 201 is in the form of circular ring having apertures 202 on its surface and is located around the swirling section 203 of the quench box. The swirling section is having inclined baffles 204 to provide swirling motion to the incoming gas-liquid mixture. The gas-liquid mixture from the swirling section impinges on the plate 205 and splash around in the mixing chamber 206 and flows downward through the weir 207. From the weir 207 it travels to the perforated plate 208 which is solid at the centre 209 below the weir outlet and having aperture 210 and a baffle in the form of the ring 211. The perforated plate 208 is open from the sides allowing the liquid to flow uniformly from all directions thus providing uniform distribution on the distributor tray 212.

According to the main embodiment, the present invention covers Quench box assembly comprising quench pipe and quench box for mixing hot reactor effluent and cold quench gas for down-flow, three-phase fixed bed hydro-processing reactor is disclosed.

In yet another embodiment, FIG. 2 along with FIG. 3 describe Quench box and process in accordance with the present invention. FIG. 3 shows the Fluid motion in accordance with the present invention. In the detailed embodiment of the present invention, the quench pipe (201) is in the form of ring having aperture while quench box consists of swirling section (203) and a mixing chamber (206) and it is located around the swirling section of quench box. The swirling section is having baffles (204) inclined at an angle preferably between 30 to 60° to provide swirling motion to the incoming fluid. The swirling motion provides better contacting between the flowing fluids. The fluid from the swirling section (203) travels to the mixing chamber (206) and impinges on the flat surface and splash around providing the residence time in the mixing chamber (206) for attaining equilibrium temperature. From the mixing chamber (206), gas-liquid mixture flows downward through the weir (207) located at the centre of mixing chamber on the perforated plate (208). The plate is having aperture (210) on its surface except the area at the centre (209) where the incoming liquid from the weir impinges the plate. A circular baffle is provided on the plate for creating turbulence and increase the residence time of fluid on the plate. The plate is having open sides and fluid travels in all direction downward on the distributor plate (212). The design is compact and eliminates the requirement of rough liquid distributor before the distribution tray. It may be noted there is only one passage for the fluid flow thus entire fluid stream will have same temperature. The swirling section (203) with inclined baffles (204) splits the incoming stream into different parts providing high gas liquid interfacial area between the quench-gas and incoming liquid. This will result in better contacting and achieving equilibrium temperature. Furthermore, the turbulence created by the swirling action (203) increases the heat transfer rate thus requiring the smaller reactor volume to attain equilibrium temperature. Furthermore, as there is only one passage for the fluid to pass through the mixing chamber (206) with high velocity, it creates high turbulence inside the mixing chamber resulting in no dead zones inside it. Due to high velocities in mixing chamber there will be no accumulation of solids/fines in the quench box. Hence, the proposed design shows better resistance to fouling. The circular baffle on the perforated plate (208) further increases the residence time of the fluid in the quench box leading to achieve equilibrium temperature. The perforated plate (208) being open from all the sides allowing the liquid to flow uniformly from all directions thus providing uniform distribution on the distributor tray (212). Hence, eliminates the requirement of rough liquid distributor before the distribution tray.

ADVANTAGES OF THE INVENTION

Therefore, the present invention shows following advantages:

1. Higher gas-liquid interfacial area for better contacting
2. Higher heat transfer rate due to turbulence
3. Require less space in the reactor
4. No dead zone
5. Better resistance to fouling
6. Higher residence time to achieve equilibrium temperature.

While specific language has been used to describe the present subject matter, any limitations arising on account thereto, are not intended. As would be apparent to a person in the art, various working modifications may be made to the method in order to implement the inventive concept as taught herein.

What is claimed is:

1. A quench box assembly for hydro-processing reactors comprising:
   a) quench pipe in the form of ring having apertures on its surface, wherein the quench pipe is adapted for quench gas flow; and
   b) quench box adapted to mix quench gas and vapour-liquid effluent from previous catalyst bed of the hydro-processing reactors to produce an incoming gas-liquid mixture, wherein the quench box comprises a swirling section with inclined baffles adapted to provide swirling action to the incoming gas-liquid mixture inclined at an angle preferably between 30 to 60° corresponding to the incoming gas-liquid mixture; and wherein the gas-liquid mixture from the swirling section impinges on a plate and splash around in a mixing chamber and flows downward through a weir.

2. The quench box assembly as claimed in claim 1, wherein the quench pipe is located around the swirling section of the quench box.

3. The quench box assembly as claimed claim 1, wherein gas-liquid mixture travels from the weir to the perforated plate which is solid at the centre below the weir outlet and having aperture and a baffle in the form of the ring.

4. The quench box assembly as claimed in claim 3, wherein the perforated plate is open from the sides allowing the liquid to flow uniformly from all directions thus providing uniform distribution on the distributor tray.

5. A process for mixing quench gas and vapor-liquid effluent by a quench box assembly, said process comprising:
   a) providing a swirling motion by a swirling section to the incoming fluid from previous bed and quench gas from a ring shaped quench pipe having apertures; wherein swirling section is having baffles inclined at an angle preferably between 30 to 60° corresponding to the incoming gas-liquid mixture;
   b) impinging the fluid from the swirling section on a plate and splashing around the mixing chamber for obtaining gas-liquid mixture and attaining equilibrium temperature;
   c) flowing the gas-liquid mixture obtained in step (b) through the weir located at the centre of mixing chamber on the perforated plate; wherein the plate is solid at the centre below the weir outlet and having aperture and a circular baffle;
   d) creating turbulence by the circular baffle and increasing the residence time of the gas-liquid mixture on the perforated plate; and
   e) flowing the gas-liquid mixture in downward direction from open sides of the perforated plate to a distributor plate.

* * * * *